Figure 1:
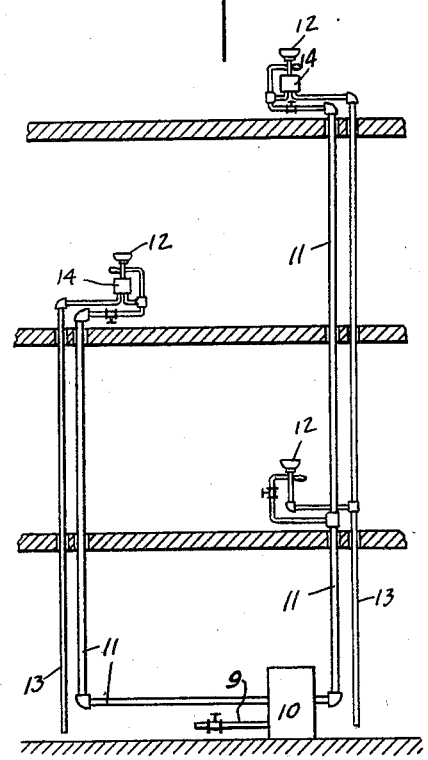

Nov. 17, 1931.     W. J. WEESNER     1,832,070
AUTOMATIC FLUID FLOW CONTROL
Filed May 3, 1929     2 Sheets-Sheet 1

INVENTOR.
WALKER J. WEESNER.
BY
Goldsmith & Galt
ATTORNEYS.

Nov. 17, 1931.  W. J. WEESNER  1,832,070
AUTOMATIC FLUID FLOW CONTROL
Filed May 3, 1929  2 Sheets-Sheet 2
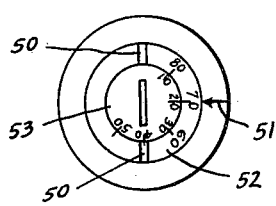
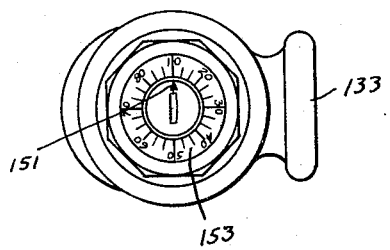
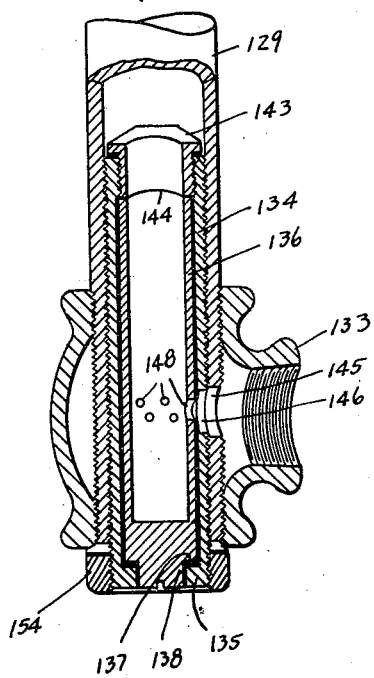
INVENTOR.
WALKER J. WEESNER.
BY
ATTORNEYS.

Patented Nov. 17, 1931

1,832,070

UNITED STATES PATENT OFFICE

WALKER J. WEESNER, OF INDIANAPOLIS, INDIANA

AUTOMATIC FLUID FLOW CONTROL

Application filed May 3, 1929. Serial No. 360,155.

This invention relates to control apparatus for regulating fluid flow and more particularly to an apparatus for use with a system wherein cooled water is supplied from a central cooling apparatus to a plurality of drinking fountains located throughout a building. In systems of this sort, it is desirable that a supply of cooled water be immediately available at each fountain. In order to accomplish this, it is necessary that water standing in the pipes supplying the fountains be periodically changed and automatically replaced by a fresh supply of cooled water.

There are two methods of constantly supplying cool water at drinking fountains in common use,—namely, the "circulation" method and the "bleeding" method. In the former, it has been the practice to provide a circulating apparatus consisting of a tank, a pump and subsequent circulating piping whereby the cooled water is continuously pumped throughout the system by an arrangement of supply and return piping connecting each drinking fountain with the cool water storage tank.

Where long runs of pipe are necessary it has sometimes been the practice to use the "bleeder" method in which an amount of water is continuously wasted from the end of the line sufficient to maintain an immediate supply of cold water at the fountains. If the fountains are frequently used, this wastage constitutes an unnecessary loss. When neither of these methods is used, the drinking fountain supply valves are often fastened in the open position by their users, thereby causing an unnecessary and constant waste of cool water. This invention relates particularly to the bleeding method.

One object of the present invention is to provide a system of fluid flow control adapted to periodically change the water standing in the drinking water supply pipes and to be applicable as well to other fluid flow apparatus.

Another object of the invention is to supply a system wherein the use of the fountain for drinking purposes automatically stops the bleeding of water.

One feature of the invention resides in the fact that the drainage is periodical rather than continuous, although other features are applicable to continuous drainage as well.

Another feature resides in a novel form of valve-operating mechanism provided.

Another feature resides in the provision of a novel form of overflow.

Another feature of the present invention is the provision of a bleeder valve which may be quickly and easily adjusted to bleed the proper amount of water for varying conditions and may be used for other purposes as well.

Figure 2:
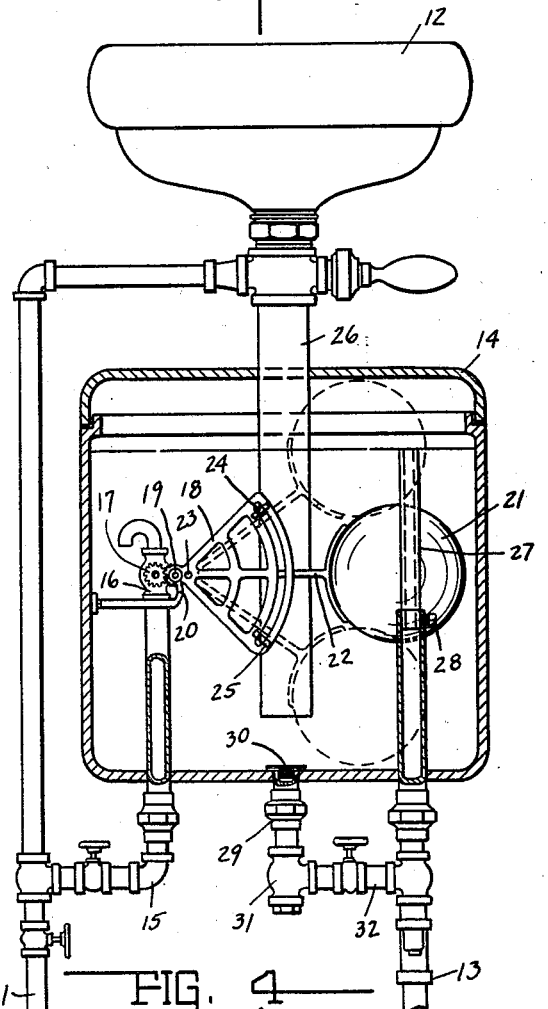
Figure 3:
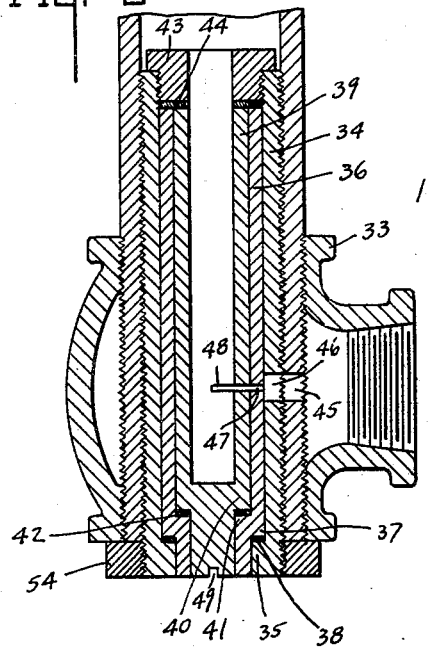
Figure 4:
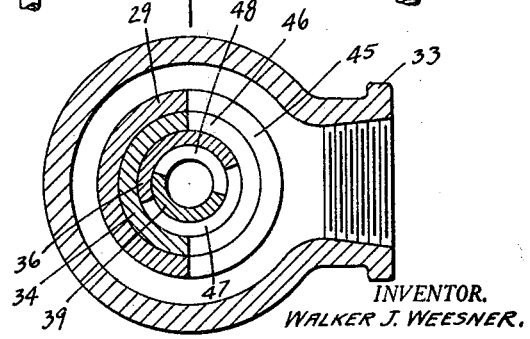

Other objects and features and the full nature of the invention will be understood from the accompanying drawings and the following specifications and claims:

Fig. 1 is a diagrammatic illustration of a section of a building having a water cooler located in the basement and a plurality of drinking fountains throughout the building supplied by pipes of varying lengths. Fig. 2 is a detail view partly in cross section of one of the drinking fountains and the associated control apparatus. Fig. 3 is an elevational cross section of one form of bleeder valve which may be used. Fig. 4 is a horizontal cross section of the same valve. Fig. 5 is a view of the dial indicator used for setting the same valve for varying conditions of pipe length and building temperature. Fig. 6 is an elevational cross section of a different type of bleeder valve. Fig. 7 is a view of the dial indicator for the bleeder valve shown in Fig. 6.

In the drawings, a water cooler 10 is located in the basement or at any other convenient part of the building and receives water from any suitable source by means of a supply pipe 9. Cold water supply lines 11 supply cooled water to a plurality of drinking fountains 12 located in various parts of the building. The supply lines 11 will differ in length and will, therefore, vary in their capacity for heat absorption. The longer the pipe, the greater will be the amount of water which must be bled therefrom to provide a supply of cool water at the fountain.

Each of the fountains is supplied with a waste pipe 13 carrying the surplus water to the sewer.

The fountain at the end of each supply pipe is provided with a tank 14 of a size sufficient to contain the amount of water to be bled from the longest expected length of pipe line at each bleeding operation. A branch 15 of the ice water supply line 11 is connected to supply water to the said tank through a float-operated valve 16 herein shown as a common form of globe valve. The stem of the valve 16 carries a gear 17 meshing with teeth cut in a combined guide and operating member 18. The member 18 is pivoted at 19 to a bracket 20 supported on the wall of tank 14 and supporting also the upper end of the pipe 15. A float 21 is carried on a lever 22 pivotally mounted at 23 to the member 18. Adjustable stops 24 and 25 are carried on the member 18 and limit the travel of the lever 22. The connection at 19 is fashioned with a considerably tighter fit than the connection at 23 so that the float 21 is free to be raised and lowered without operating the valve 17 until the lever 22 comes in contact with one of the stops 24 and 25. By this construction, the valve 17 will be closed only when the float has risen to a point where the lever 22 contacts with the stop 24 and will be opened only when the float 21 has been lowered to a point where lever 22 contacts with stop 25.

A drain pipe 26 conducts waste water from the drinking fountain 12 to the tank 14. A telescopic overflow 27 within the tank connects with the overflow line 13 and may be adjusted to any desired height and maintained in position by a set screw 28. This prevents filling and overflowing of the tank due to repeated use of the fountain.

In the bottom of the tank is an outlet 29 protected by a strainer 30 and connecting to a bleeder valve 31. The bleeder valve is in turn connected through pipe 32 to the waste pipe 13. The bleeder valve 31 is adjustable to bleed the proper amount of water for varying conditions of pipe length and building temperature as will be hereinafter described.

In the operation of this apparatus, water will be continuously withdrawn from the tank through the bleeder valve until the float reaches its lowermost position and opens the valve 16. An amount of water will then be drawn into the tank sufficient to raise the float into its uppermost position and close the valve 16. The bleeding will then continue until the float is again lowered and the cycle repeated. If the fountain is used for drinking during the period of drainage of the tank, the water wasted from the drinking operation will enter the tank and cause the raising of the float. The succeeding bleeding cycle will thereby be postponed until all of the water so wasted has been drawn through the bleeder valve.

If continuous drainage is desired the lever 22 may be fastened directly to the member 18. The water level in the tank will then be maintained at a practically constant position and the drainage will be continuous so long as the fountain is not used. Use of the fountain will automatically stop the drainage until the wasted water has been removed through the bleeder valve, as hereinbefore described.

If it is not desired to use the economy feature present in the tank and float apparatus and if continuous drainage is desired, the particular type of bleeder valve herein described may be connected directly between the supply pipe 11 and the drain pipe 13.

A preferred form of bleeder valve is shown in Figs. 3, 4 and 5. In this form the lower end of the outlet pipe 29 is threaded internally and externally and extends completely through the run of a T fitting 33. The external threads of the pipe 29 engage with the internal threads of the said fitting. An externally-threaded sleeve 34 engages the internal threads of the pipe 29 and carries on its lower end an internal shoulder 35. A non-threaded sleeve 36 is snugly fitted within the sleeve 34 and has an external shoulder 37 engaging the internal shoulder 35 of the sleeve 34 with a gasket 38 therebetween. A second non-threaded sleeve 39 is snugly fitted within the sleeve 36 and has an external shoulder 40 engaging the internal shoulder 41 of the sleeve 36 with a gasket 42 therebetween. The sleeve 39 is closed at its lower end to form a catch basin for dirt and other foreign matter and to prevent the outflow of water from the lower end of the valve.

A bushing 43 is externally threaded and engages with internal threads in the upper end of sleeve 34. A gasket 44 is interposed between the lower surface of the bushing 43 and the upper surface of the sleeves 36 and 39. An opening 45 is provided in the pipe 29 and extends substantially half way around the said pipe. A similar opening 46 is provided in the sleeve 34 registering with the opening 45. A narrower opening 47 is provided in the sleeve 36 and extends substantially half way around the said sleeve. A similar opening 48 is provided in the sleeve 39. The ports 47 and 48 may be formed of a series of holes rather than a continuous port if desired. A groove 49 in the closed end of the sleeve 39 provides a convenient method of rotating said sleeve by means of a screw driver. Similar grooves 50 in the lower end of the sleeve 36 provide a means of rotating that sleeve. A lock nut 54 is engaged with the lower end of pipe 29 and maintains the assembly in position.

Marked on the lower end of the sleeve 34 is an arrow head 51. Marked on the lower end of the sleeve 36 are graduations 52 referring to the average building temperature. Marked on the lower end of the sleeve 39 are graduations 53 indicating the length of supply pipe. In the operation of the valve, the relative movement of the sleeves 36 and 39 cause the openings 47 and 48 to coincide over a greater or less distance and thereby permit the flow of more or less water as desired. The rotation of sleeve 36 in a clockwise direction, referring to Fig. 4, or counter-clockwise, referring to Fig. 5, will decrease the flow of water with a given setting of the sleeve 39. Similarly with a given setting of the sleeve 36, rotation of sleeve 39 in a counterclockwise direction, referring to Fig. 4, or clockwise direction, referring to Fig. 5, will decrease the flow of water. The graduations on the indicating dial are so chosen that the proper amount of water for a given building temperature and a given length of supply pipe will be bled from the valve when the graduations corresponding to said temperature and said pipe length are both brought opposite the arrow 51.

In Figs. 6 and 7 is illustrated another form of bleeder valve for use when only one adjustment is desired. In this valve the pipe 129 is inserted in a T fitting 133 in a similar manner to that described for the previous type of valve. A sleeve 134 is threadedly inserted therein and a non-threaded sleeve 136 is snugly fitted in sleeve 134. The sleeve 136 has an external shoulder 137 engaging an internal shoulder 135 on the sleeve 134 with a gasket 138 therebetween. A bushing 143 is threadedly engaged in the upper end of the sleeve 134 and engages the upper end of the sleeve 136 with the gasket 144 therebetween. The pipe 129 and the sleeve 134 are provided with substantially circular openings 145 and 146 positioned to register with each other. A series of holes of varying size 148 is provided in the sleeve 136 in such manner that holes of one size will register with the openings 145 and 146 when the sleeve is in one position and holes of a different size will register therewith when the sleeve is turned to another position. On the lower end of the sleeve 134 are provided graduations 153 indicating the length of supply pipe. An arrow 151 is marked on the lower end of the sleeve 136 to register with the said graduations. A lock nut 154 engages the lower end of pipe 129 and maintains the assembly in position.

In the operation of this valve, the sizes of the holes 148 are selected so that the proper size of hole will register with the openings 145 and 146 to bleed the proper amount of water for a given length of pipe when the arrow 151 registers with the graduations 153 corresponding to that length of pipe.

The invention claimed is:

1. A drinking water supply system including a water cooler, a drinking fountain, a pipe line supplying cooled water from said cooler to said fountain, a tank associated with said fountain, a second pipe line connecting said first pipe line to said tank, a valve for controlling the flow of water through said second-mentioned pipe line, means for draining water from said tank at a measured rate, and float-operated mechanism controlling said valve to admit water to said tank when the water level therein has dropped to a predetermined level and to stop the admission of water thereto when the water level in said tank has been raised to a second predetermined level.

2. A drinking water supply system including a water cooler, a drinking fountain, a pipe line supplying cooled water from said cooler to said fountain, a tank associated with said fountain, a second pipe line connecting said first pipe line to said tank, a valve for controlling the flow of water through said second-mentioned pipe line, means for draining water from said tank at a measured rate, float-operated mechanism controlling said valve to admit water to said tank when the water level therein has dropped to a predetermined level and to stop the admission of water thereto when the water level in said tank has been raised to a second predetermined level, and a waste pipe conducting wasted water from said fountain to said tank.

3. A drinking water supply system including a water cooler, a drinking fountain, a pipe line supplying cooled water from said cooler to said fountain, a tank associated with said fountain, a second pipe line connecting said first pipe line to said tank, a valve for controlling the flow of water through said second-mentioned pipe line, means for draining water from said tank at a measured rate, float-operated mechanism controlling said valve to admit water to said tank when the water level therein has dropped to a predetermined level and to stop the admission of water thereto when the water level in said tank has been raised to a second predetermined level, and a telescopically adjustable overflow for said tank.

4. A drinking water supply system including a water cooler, a drinking fountain, a pipe line supplying cooled water from said cooler to said fountain, a tank associated with said fountain, a second pipe line connecting said first pipe line to said tank, a valve for controlling the flow of water through said second-mentioned pipe line, means for draining water from said tank at a measured rate, float-operated mechanism controlling said valve to admit water to said tank when the water level therein has dropped to a predetermined level and to stop the admission of water thereto when the water level in said tank has been raised to a second predetermined level, a waste pipe conducting wasted water from said fountain to said tank, and a telescopically adjustable overflow for said tank.

5. A cooling water system including a water cooler, a drinking fountain, a pipe line supplying water from said cooler to said drinking fountain, a tank associated with said drinking fountain, a second pipe line connecting said first-mentioned pipe line and said tank, means for draining water from said tank at a measured rate, a valve controlling the flow of water through said second pipe line, an operating member for said valve, a float, a lever connected to said float and pivotally mounted on said operating member, and adjustable stops on said operating member adapted to contact with said lever whereby the said valve is closed when said lever contacts with one of said stops and opened when said lever contacts with the other of said stops.

In witness whereof, I have hereunto affixed my signature.

WALKER J. WEESNER.